(12) United States Patent
Sacristan San Martin et al.

(10) Patent No.: US 12,308,709 B2
(45) Date of Patent: May 20, 2025

(54) ELECTRIC CONNECTION FOR A ROTOR WINDING OF AN ELECTRICAL GENERATOR

(71) Applicant: Siemens Gamesa Renewable Energy Innovation & Technology S.L., Sarriguren (ES)

(72) Inventors: Juan Manuel Sacristan San Martin, Amurrio Araba (ES); Ibon Sedano Perez, Bilbao (ES); Lucas Cueto Diaz, Bilbao (ES); Ivana Fojtikova, Brumov-Bylnice (CZ); Frantisek Mericka, Vlachovice (CZ)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/268,368

(22) PCT Filed: Dec. 1, 2021

(86) PCT No.: PCT/EP2021/083686
§ 371 (c)(1),
(2) Date: Jun. 20, 2023

(87) PCT Pub. No.: WO2022/135853
PCT Pub. Date: Jun. 30, 2022

(65) Prior Publication Data
US 2024/0030787 A1 Jan. 25, 2024

(30) Foreign Application Priority Data

Dec. 23, 2020 (EP) .................... 20383148

(51) Int. Cl.
*H02K 13/02* (2006.01)
*F03D 9/25* (2016.01)
*H02K 7/18* (2006.01)

(52) U.S. Cl.
CPC ............... *H02K 13/02* (2013.01); *F03D 9/25* (2016.05); *H02K 7/183* (2013.01); *F05B 2220/706* (2013.01)

(58) Field of Classification Search
CPC ........ H02K 13/02; H02K 7/183; H01R 39/34; F03D 9/25
See application file for complete search history.

(56) References Cited

U.S. PATENT DOCUMENTS

| 5,777,408 A | 7/1998 | Brem |
| 2002/0070624 A1 | 6/2002 | Rehder et al. |

(Continued)

FOREIGN PATENT DOCUMENTS

WO WO-2016030471 A1 * 3/2016 ............. H02K 13/02

OTHER PUBLICATIONS

International Search Report for PCT/EP2021/083686 issued on Feb. 25, 2022.
Written Opinion for PCT/EP2021/083686 issued on Feb. 25, 2022.

*Primary Examiner* — Sean Gugger
(74) *Attorney, Agent, or Firm* — Schmeiser, Olsen & Watts, LLP

(57) ABSTRACT

An electrical connector is provided for electrically connecting a rotor of an electric generator to a slip ring and includes: a first support cartridge, the first support cartridge being electrically isolated, at least a second support cartridge distanced from the first support cartridge along a longitudinal axis of the electrical connector, the second support cartridge being electrically isolated, at least one conductive bar extending along the longitudinal axis, the conductive bar being fixed to the first support cartridge and the second (Continued)

support cartridge, and a winding connector for electrically connecting the at least one conductive bar to a rotor winding of the rotor.

7 Claims, 3 Drawing Sheets

(56) References Cited

U.S. PATENT DOCUMENTS

2007/0267937 A1\* 11/2007 Nishimura ........... H02K 21/044
  310/263
2018/0131149 A1\* 5/2018 Binder ................... H01R 39/08

\* cited by examiner

ELECTRIC CONNECTION FOR A ROTOR WINDING OF AN ELECTRICAL GENERATOR

CROSS-REFERENCE TO RELATED APPLICATIONS

This application claims priority to PCT Application No. PCT/EP2021/083686, having a filing date of Dec. 1, 2021, which claims priority to EP Application No. 20383148.2, having a filing date of Dec. 23, 2020, the entire contents both of which are hereby incorporated by reference.

FIELD OF TECHNOLOGY

The following relates to an electric generator including a stator and a rotor having a stator winding and a rotor winding, respectively. The following may be efficiently applied to an electric generator of a wind turbine.

BACKGROUND

An electric generator, such as an electric generator installed in a wind turbine, typically comprises a rotor which rotates relative to a stator. Electric generators are known to have two different sets of windings: a stator winding and a rotor winding. A so-called Doubly Fed Induction Generator (DFIG) is for example an electric generator of such type. The rotor and stator windings may be electrically independent from one another and separately connected to the electrical equipment outside the machine, which may be for example used to transfer electrical power to a utility grid. Such electric generator may further include a slip ring, which is arranged on the rotor shaft and which permits, by sliding contacts, to establish an electrical connection between the rotor windings and the external electrical equipment.

It is known to connect the rotor winding to the slip ring through connection wires. The use of a wire connection determines a plurality of drawbacks, for example in terms of time and cost of production.

Therefore, the scope of embodiments of the present invention is to provide an electrical connection between the rotor winding and the slip ring, which may overcome the drawbacks of the conventional art.

SUMMARY

An aspect relates to an electrical connector for electrically connecting a rotor of an electric generator to a slip ring. The electrical connector comprises:
 a first support cartridge, the first support cartridge being electrically isolated,
 at least a second support cartridge distanced from the first support cartridge along a longitudinal axis of the electrical connector, the second support cartridge being electrically isolated,
 at least one conductive bar extending along the longitudinal axis, the conductive bar being fixed to the first support cartridge and the second support cartridge,
 a winding connector for electrically connecting the at least one conductive bar to a rotor winding of the rotor.

An electric generator including the above-described electrical connector may be integrated in a wind turbine. An electric generator including the above-described electrical connector may be a Doubly Fed Induction Generator (DFIG).

The electrical connector of embodiments of the present invention provide an electrical connection between the rotor winding and external stationary electrical components without using connection wires. Such solution is characterized by modularity and provides time reduction during the manufacturing process and a reduction of costs.

According to embodiments of the invention, the electrical connector comprises a plurality of conductive bars, each conductive bar extending along the longitudinal axis and being fixed to the first support cartridge and the second support cartridge, the plurality of conductive bars being distributed about the longitudinal axis.

According to embodiments of the invention, the electrical connector comprises a hollow housing. The hollow housing provides an external surface of the electrical connector, which may be coupled with an axial cavity provided in the rotor shaft.

According to embodiments of the invention, the electrical connector comprises an insulating filler between the hollow housing and the conductive bars. The insulating filler provides stability to the assembly thus avoiding vibrations and undesired movements.

According to embodiments of the invention, the electrical connector comprises a slip ring connector for providing an electrical connection between the at least one conductive bar and an external surface of the slip ring.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
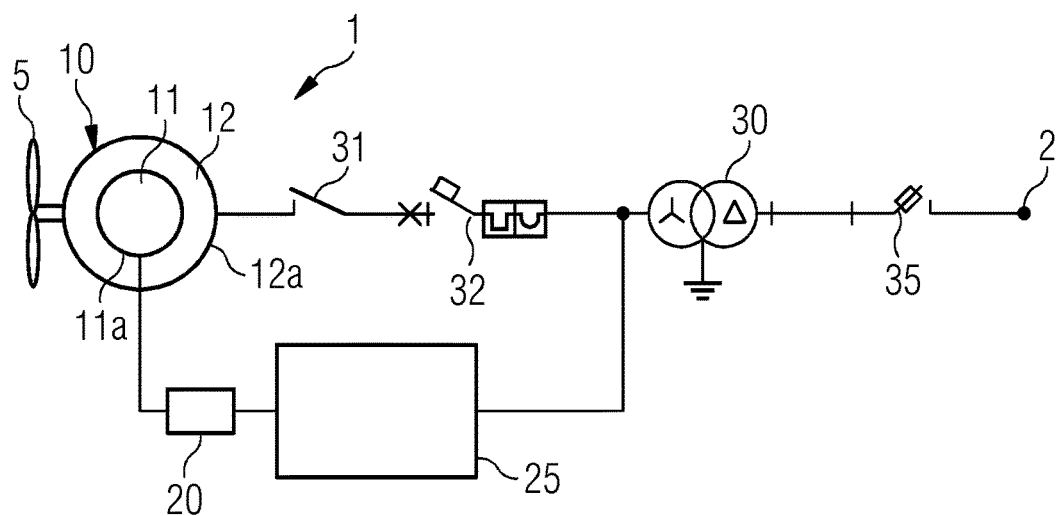
FIG. 1 shows a scheme section of a wind turbine including an electrical generator according to embodiments of the present invention, the electric generator being connected to an electric grid.
Figure 2:
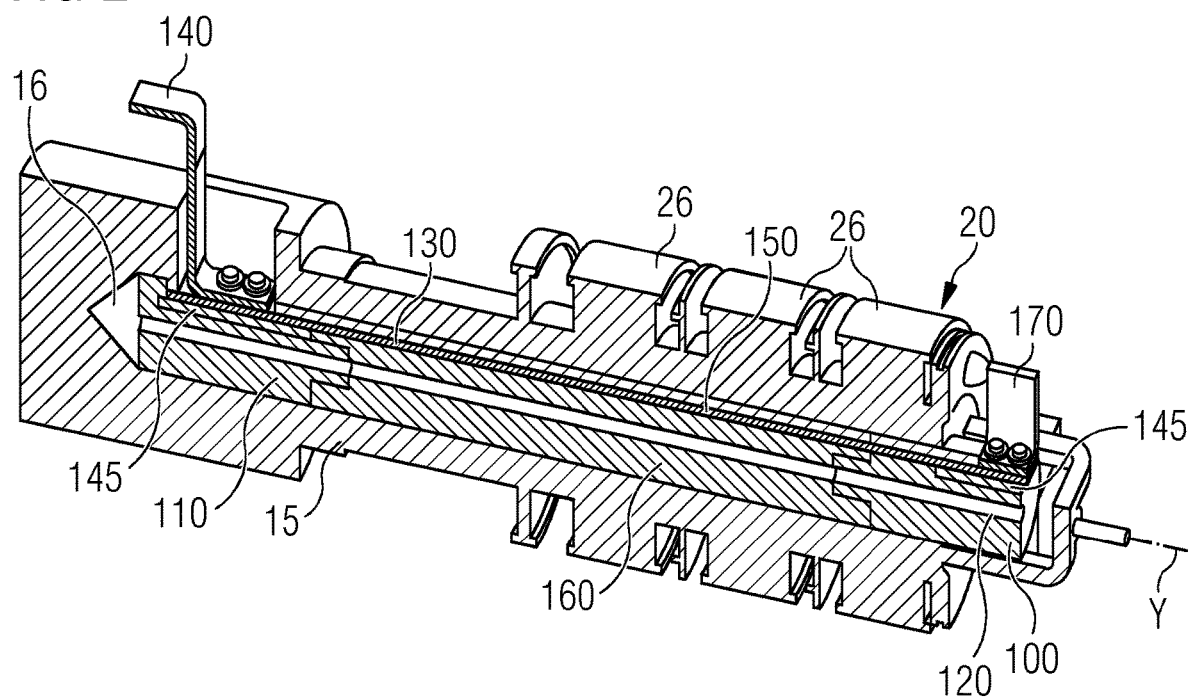
FIG. 2 shows an axonometric view of an electrical connector according to embodiments of the present invention, to be used in the electrical generator of FIG. 1.

FIG. 1 shows a simplified scheme of an electrical connection between a wind turbine 1 and an electrical grid 2. The wind turbine 1 includes a wind rotor 5 having a plurality of wind blades powered from the wind. The wind rotor 5 is rotationally coupled with an electrical generator 10. The electrical generator 10 converts the mechanical power coming from the wind rotor 5 to an electrical power to be provided to the electrical grid 2. According to other embodiments of the present invention (not shown), the electrical generator 10 may not be connected to a wind turbine but to any other source of primary power, different from the wind. The electrical generator 10 includes a rotor 11 and a stator 12. The rotor 11 is radially internal to the stator 12 and is rotatable with respect to the stator 12 about a rotational axis. According to other embodiments of the present invention (not shown), the rotor 11 may be radially external to the stator 12. The electrical generator 10 is a Doubly Fed Induction Generator (DFIG). The rotor 11 and the stator 12 comprises a rotor winding 11a and a stator winding 12a, respectively. According to other embodiments of the present invention, the electrical generator 10 may be another type of electrical generator including a rotor winding 11a. The rotor winding 11a and the stator winding 12a are electrically independent and separately connected to a transformer 30, for transforming the electrical power provided by both the rotor winding 11a and a stator winding 12a to an electrical voltage compatible with the electrical grid 2. The rotor winding 11a is electrically connected to a frequency converter 25 for transforming the electrical power provided by the grid to an electrical frequency compatible with the rotor 11. Between the rotor winding 11a and the frequency converter 25 a slip ring 20 is provided, which permits, by sliding contacts, for example brushes, to establish an electrical connection between the rotor winding 11a and the other stationary electrical components. The frequency converter 25 is connected to the transformer 30. The stator winding 12a is connected to the transformer 30 via an electrical contactor 31 and a circuit breaker 32. The output of the transformer 30 is connected to the electrical grid 2 via a switch gear 35.

Figure 3:
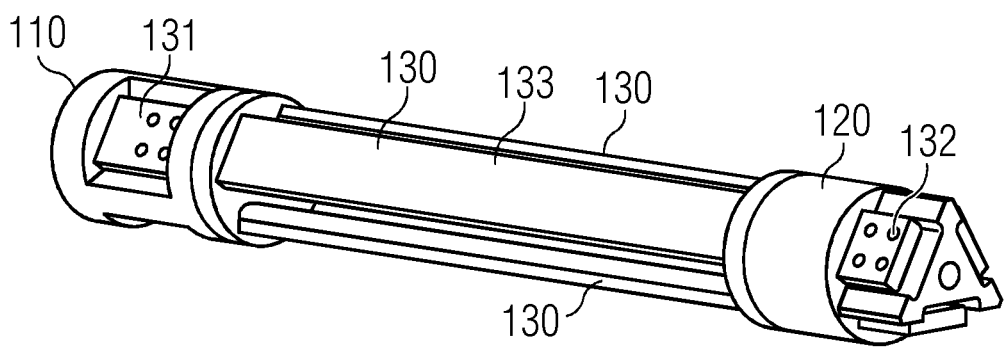
FIG. 3 shows an axonometric view of a first component of the electrical connector of FIG. 2 according to embodiments of the present invention.
Figure 4:
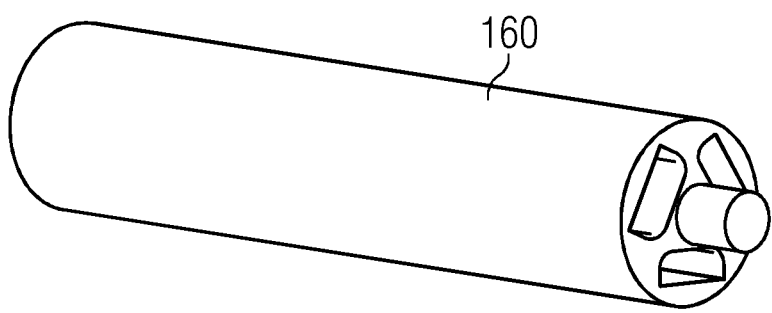
FIG. 4 shows an axonometric view of a second component of the electrical connector of FIG. 2 according to embodiments of the present invention.
Figure 5:
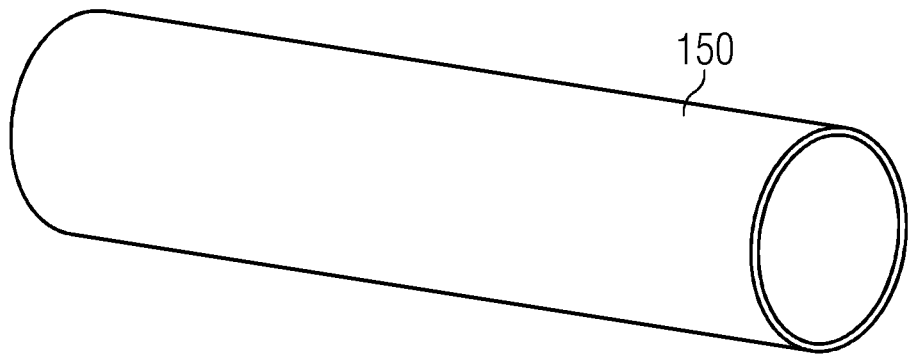
FIG. 5 shows an axonometric view of a third component of the electrical connector of FIG. 2 according to embodiments of the present invention.
Figure 6:
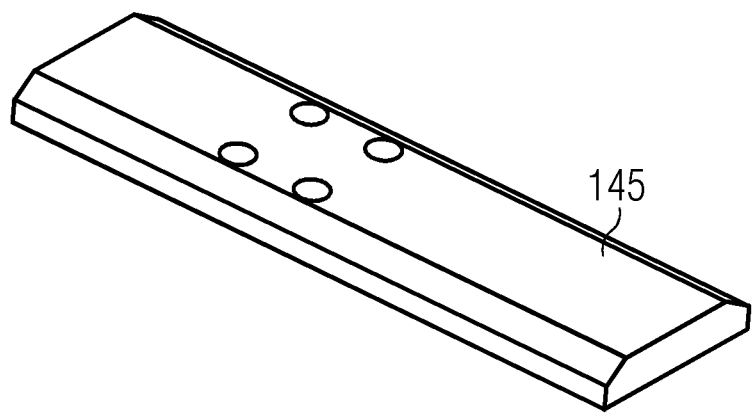
FIG. 6 shows an axonometric view of a fourth component of the electrical connector of FIG. 2 according to embodiments of the present invention.
Figure 7:
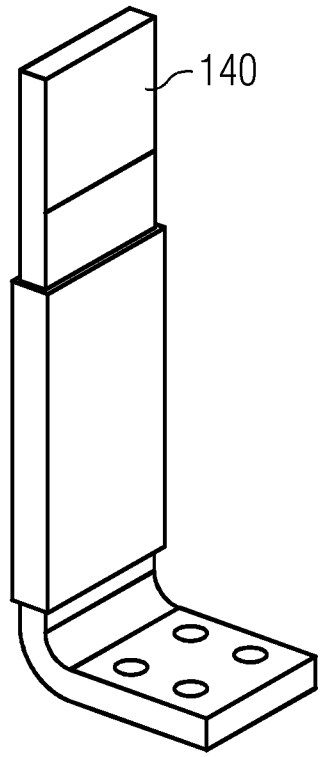
FIG. 7 shows an axonometric view of a fifth component of the electrical connector of FIG. 2 according to embodiments of the present invention.

FIGS. 2 to 7 show an electrical connector 100 for electrically connecting the rotor winding 11a of the rotor 11 to the slip ring 20. The electrical connector 100 has an elongated shape and extends along a longitudinal axis Y. The electrical connector 100 may be housed inside a cavity 16 of a rotor shaft 15 of the rotor 11. The cavity 16 and the longitudinal axis Y may be parallel or coincident with a rotational axis of the rotor shaft 15. According to embodiments of the present invention, the electrical connector 100 may be used in a new electrical generator 10 or for refurbishing an existing electrical generator. The electrical connector 100 comprises a first support cartridge 110 and a second support cartridge 120, distanced from the first support cartridge 110 along the longitudinal axis Y. The first support cartridge 110 and the second support cartridge 120 are electrically isolated. For example, the first support cartridge 110 and the second support cartridge 120 may be made from a molded or machined insulated material. According to other embodiments of the present invention (not shown), the electrical connector 100 may comprise more than two support cartridges 110, 120. The electrical connector 100 further comprises one or more conductive bar 130 (three conductive bars 130 in the embodiment of the attached figures) extending along the longitudinal axis Y. As shown in the attached figures, a plurality of conductive bars 130 may be distributed about the longitudinal axis Y. In particular, the plurality of conductive bars 130 may be regularly distributed about the longitudinal axis Y (as shown in FIG. 3, each of the three conductive bars 130 is angularly distanced from the other two conductive bars 130 of an angle of 120°, measured about the longitudinal axis Y). The conductive bar 130 is made of copper. According to other embodiments of the present invention, the conductive bar 130 may be made of another conductive material. The conductive bars 130 are fixed to the first support cartridge 110 and the second support cartridge 110. In embodiments including more than two support cartridges, the conductive bars 130 may be fixed to two or more support cartridges. Each conductive bar 130 extends from a first longitudinal end 131 to a second opposite longitudinal 132. The first longitudinal end 131 and the second opposite longitudinal 132 are respectively coupled with the first support cartridge 110 and the second support cartridge 120. Each conductive bar 130 further comprises an intermediate bar portion 133 extending between the first support cartridge 110 and the second support cartridge 120.

The electrical connector 100 comprises a winding connector 140 for electrically connecting the at least one conductive bar 130 to the rotor winding 11a. The winding connector 140 may be connected, for example by means or screws or by welding, to the first longitudinal end 131 of at least one conductive bar 130. A connection plate 145 is used for fixing the winding connector 140 to the conductive bar 130, in such a way that the conductive bar 130 is interposed between the winding connector 140 and the connection plate 145. In such embodiment the connection plate 145 act as a counterpart for the connection with the winding connector 140, i.e., screws or bolts passing through holes provided on the conductive bar 130 may be active between the winding connector 140 and the connection plate 145. According to other embodiments of the present invention, the connection plate 145 may not be present, i.e. the winding connector 140 may be directly fixed to the at least one conductive bar 130. The winding connector 140 and the connection plate 145 are electrically conductive. The electrical connector 100 comprises a slip ring connector 170 for electrically connecting at least one conductive bar 130 to the slip ring 20, in such a way that the electrical power from the rotor winding 11a is transferred to an external surface 26 of the slip ring 20, where sliding contacts, for example stationary brushes (not shown in the attached figure), are provided. The slip ring connector 170 is electrically conductive. The slip ring connector 170 may be connected, for example by means or screws or by welding, to the second longitudinal end 132 of at least one conductive bar 130. Another conductive connection plate 145 may also be used, as described above for the winding connector 140, for fixing the slip ring connector 170 to the conductive bar 130, in such a way that the conductive bar 130 is interposed between slip ring connector 170 and the connection plate 145. The conductive bar(s) 130, the winding connector 140, the slip ring connector 170 and the connection plate(s) 145 are made of materials providing an electrical connection between the rotor winding 11a and the sliding contacts of the slip ring 20. The winding connector 140 and the slip ring connector 170 may be shaped as rigid elements. The winding connector 140 and the slip ring connector 170 may be shaped as plates having an "I" or an "L" or "Z" profile.

The electrical connector 100 further comprises a hollow housing 150. The hollow housing 150 may comprise aluminum or steel, for example stainless steel. The hollow housing 150 may be shaped as a cylindrical hollow wall coaxial with the longitudinal axis Y. The diameter of the hollow housing 150 is dimensioned in order that the electrical connector 100 can be housed in the axial cavity 16 of the rotor shaft 15. The hollow housing 150 may longitudinally extend between the first support cartridge 110 and the second support cartridge 120, about intermediate bar portion 133. In other embodiments of the present invention, the hollow housing 150 may extend also about the first longitudinal end 131 and the second longitudinal end 132. The hollow housing 150 is distanced from the conductive components of the electrical connector 100, in particular from the conductive bar(s) 130, an insulating filler 160 being provided between the hollow housing 150 and the conductive bar(s) 130. The insulating filler 160 may be made of resin. The insulating filler 160 hold the assembly including the conductive bar(s) 130, the first support cartridge 110, the second support cartridge 120, the winding connector 140, the slip ring connector 170 and the connection plate(s) 145, avoiding vibrations and movements.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electrical connector for electrically connecting a rotor of an electric generator to a slip ring, the electrical connector comprising:
   a first support cartridge, the first support cartridge being electrically isolated,
   at least a second support cartridge distanced from the first support cartridge along a longitudinal axis of the electrical connector, the second support cartridge being electrically isolated,
   at least one conductive bar extending along the longitudinal axis, the at least one conductive bar being fixed to the first support cartridge and the second support cartridge, and
   a winding connector for electrically connecting the at least one conductive bar to a rotor winding of the rotor,
   wherein the electrical connector comprises a hollow housing, and wherein the electrical connector comprises an insulating filler provided between the hollow housing and the at least one conductive bar, and
   wherein the electrical connector is configured to be housed within an axial cavity of a rotor shaft of the rotor.

2. The electrical connector as claimed in claim 1, wherein the electrical connector comprises a plurality of conductive bars, each conductive bar extending along the longitudinal axis and being fixed to the first support cartridge and the second support cartridge, the plurality of conductive bars being distributed about the longitudinal axis.

3. The electrical connector as claimed in claim 1, wherein the electrical connector comprises a slip ring connector for electrically connecting the at least one conductive bar to an external surface of the slip ring.

4. The electrical connector as claimed in claim 3, wherein the winding connector and the slip ring connector are provided at longitudinally opposite ends of the electrical connector.

5. A rotor for an electric generator comprising a rotor winding, a rotor shaft, and an electrical connector,
   the electrical connector being attached to the rotor shaft and having a first support cartridge, the first support cartridge being electrically isolated, at least a second support cartridge distanced from the first support cartridge along a longitudinal axis of the electrical connector, the second support cartridge being electrically isolated, at least one conductive bar extending along the longitudinal axis, the at least one conductive bar being fixed to the first support cartridge and the second support cartridge, and a winding connector for electrically connecting the at least one conductive bar to the rotor winding,
   wherein the electrical connector comprises a hollow housing, and wherein the electrical connector comprises an insulating filler provided between the hollow housing and the at least one conductive bar, and
   wherein the rotor shaft comprises an axial cavity for housing the electrical connector.

6. An electric generator comprising a rotor having a rotor winding, a rotor shaft, a slip ring, and an electrical connector,
   the electrical connector being attached to the rotor shaft and providing an electrical connection between the rotor winding and the slip ring, the electrical connector having a first support cartridge,
   the first support cartridge being electrically isolated,
   at least a second support cartridge distanced from the first support cartridge along a longitudinal axis of the electrical connector, the second support cartridge being electrically isolated,
   at least one conductive bar extending along the longitudinal axis, the at least one conductive bar being fixed to the first support cartridge and the second support cartridge, and a winding connector for electrically connecting the at least one conductive bar to the rotor winding of the rotor,
   wherein the rotor shaft comprises an axial cavity for housing the electrical connector,
   wherein the electrical connector comprises a hollow housing, and wherein the electrical connector comprises an insulating filler provided between the hollow housing and the at least one conductive bar.

7. A wind turbine comprising the electric generator according to claim 6.

* * * * *